United States Patent [19]

Dietz et al.

[11]  4,369,270

[45]  Jan. 18, 1983

[54] PIGMENT DISPERSIONS AND USE THEREOF

[75] Inventors: Erwin Dietz, Kelkheim; Max Grossmann; Michael Maikowski, both of Frankfurt am Main, all of Fed. Rep. of Germany

[73] Assignee: Hoechst Aktiengesellschaft, Frankfurt am Main, Fed. Rep. of Germany

[21] Appl. No.: 111,792

[22] Filed: Jan. 14, 1980

[30] Foreign Application Priority Data

Jan. 16, 1979 [DE] Fed. Rep. of Germany ....... 2901462

[51] Int. Cl.³ .......................... C08L 1/26; C08L 61/10
[52] U.S. Cl. .......................................... 524/33; 106/20;
106/170; 106/288 B; 106/288 Q; 106/308 M;
428/524; 524/88; 524/90; 524/145; 524/241;
524/377; 524/596
[58] Field of Search ....................... 260/29.3, 14, 37 P,
260/38; 106/23, 170, 308 M, 288 Q; 525/507;
524/33, 88, 90, 145, 241, 377, 596

[56] References Cited

U.S. PATENT DOCUMENTS

| | | | |
|---|---|---|---|
| 2,454,541 | 11/1948 | Bock et al. | 525/507 |
| 3,058,919 | 10/1962 | Hagge et al. | 252/336 |
| 3,320,212 | 5/1967 | Shen et al. | 525/507 |
| 3,874,891 | 4/1975 | Grobmann et al. | 106/308 S |
| 3,878,136 | 4/1975 | Höfel et al. | 260/14 |
| 4,009,142 | 2/1977 | Deubel et al. | 260/38 |
| 4,024,096 | 5/1977 | Wachtel | 260/29.3 |
| 4,101,489 | 7/1978 | Reitz et al. | 260/29.3 |

FOREIGN PATENT DOCUMENTS 1513160  6/1978  United Kingdom.

*Primary Examiner*—Theodore E. Pertilla
*Attorney, Agent, or Firm*—Curtis, Morris & Safford

[57]  ABSTRACT

Dispersions containing (a) a pigment, (b) an oxalkylated novolak, (c) urea and/or a compound containing at least 2 long-chain aliphatic groups and which are connected via a bridge member containing ester and/or amide groups, and (d) water and/or agents retarding drying up, and, optionally, usual adjuvants, are useful for pigmenting natural or synthetic materials, especially aqueous systems containing cellulose ethers.

30 Claims, No Drawings

PIGMENT DISPERSIONS AND USE THEREOF

Pigment dispersions which are the object of the present invention contain, inorganic or organic pigments, oxalkylated polynuclear condensation products of aromatic hydroxy compounds and alkanals, urea and/or compounds having at least two long-chain aliphatic radicals each containing more than 9 carbon atoms and linked with one another via ester or acid amide bonds, and water and/or water retention agents; these dispersions, optionally, contain usual auxiliaries. They are suitable for pigmenting natural and synthetic, preferably aqueous, systems.

Suitable inorganic pigments are for example white and colored pigments, such as iron oxides, chromium oxides, zinc sulfides, cadmium sulfides and cadmium selenides, titanium dioxide pigments, nickel or chrome titanium yellow, chromate pigments, mixed oxides of cobalt and aluminum, and carbon black and extender pigments. Suitable organic pigments are for example azo- and azomethine pigments, phthalocyanines, quinacridones, flavanthrones, anthanthrones and pyranthrones, derivatives of perylenetetracarboxylic acid or naphthalenetetracarboxylic acid, of thioindigo, of dioxazine, of tetrachloro-isoindolinone, and laked pigments. Mixtures of inorganic and organic pigments may alternatively be used, for example lead chromate pigments with organic yellow or red pigments.

For the preparation of the above condensation products of aromatic hydroxy compounds and alkanals, there are used compounds of the formulae

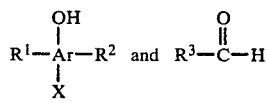

in which Ar is the aromatic system of benzene or naphthalene; $R^1$, $R^2$ and $R^3$, independently of one another stand for a hydrogen atom or an alkyl, alkenyl, or aralkyl, especially phenylalkyl or cycloalkyl, radical having up to 30 carbon atoms, which may be interrupted by —O—, —S—, —$NR^4$—, —CO—, —COO—, —$CONR^4$— or arylene, especially phenylene, and which may carry halogen atoms, or especially chlorine atoms, hydroxy or carboxy groups; X is hydrogen, halogen, especially chlorine, —$OR^4$, —$COR^4$, —$COOR^4$ or —$CONR^4R^5$; and $R^4$ and $R^5$, independently of each other, are hydrogen atoms or short-chain alkyl radicals having up to 6 carbon atoms.

Suitable examples of aromatic hydroxy compounds are phenol and alkyl- or dialkylphenols such as cresols, ethylphenols, propylphenols, butylphenols and especially phenols having longer-chain alkyl radicals such as hexylphenols, octylphenols, nonylphenols, dinonylphenols or dodecylphenols. There may be used furthermore chlorophenols, salicylic acid, hydroxy-acetophenone, p-dimethylaminophenol, p-acetamidphenol, 4,4'-dihydroxydiphenyl, 4,4'-dihydroxydiphenylmethane, hydroquinone, resorcinol or pyrocatechol as well as the ethers obtainable therefrom, for example by reaction with alkyl halides and alkyl sulfates, especially lower alkyl ethers, and alpha-naphthol, beta-naphthol, alkylnaphthols and corresponding tetrahydronaphthols.

Examples of the alkanals to be used in the condensation are formaldehyde or compounds yielding formaldehyde such as paraformaldehyde, trioxan, tetraoxymethylene or hexamethylene-tetramine; acetaldehyde or paraldehyde; propionaldehyde, butyraldehyde, valeraldehyde, enanthaldehyde or higher linear and branched aldehydes such as lauric aldehyde, palmitic aldehyde, stearic aldehyde; and aldehydes from oxosynthesis such as i-nonanal, i-tridecanal and i-hexadecanal.

The aromatic hydroxy compounds as well as the alkanals can be used for the condensation either per se or in admixture with other compounds of the same species. Condensation is carried out in known manner at a temperature of from 20° to 180° C., preferably 50° to 150° C., in the presence of an acidic catalyst, using a molar excess of hydroxy compound. The condensation products so obtained are defined as novolaks. In the condensation reaction the aromatic hydroxy compounds and the alkanals are used preferably in a molar ratio of from 12:11 to 2:1. The water which forms in the reaction is distilled off first under normal pressure and subsequently under reduced pressure, until a water content of less than 0.5 weight % is attained in the final product. Preferred condensation products have a mean molecular weight of from 400 to 500, and contain at least one alkyl radical having more than 5 carbon atoms per two aromatic ring systems each.

Oxalkylation of the condensation products can be carried out in known manner in the presence of alkaline catalysts at a temperature of from 100° to 210° C. Preferred compounds are obtained by reacting the condensation products with ethylene oxide and/or 1,2-propylene oxide; alternatively however, butylene oxide or styrene oxide may be employed for the oxalkylation. When more than one alkylene oxide is to be added, for example a combination of ethylene oxide and propylene oxide, they may be employed in the oxalkylation either as a mixture, in succession or in repeated succession. The products obtained in the first case are defined as "mixed" oxalkylates, and those produced in the latter are called "block" oxalkylates.

By varying his selection of the aromatic hydroxy compounds and the alkanals, as well as the operation mode of oxalkylation, the expert skilled in the art is able to vary the ratio of hydrophilic to hydrophobic groups in the molecule and to adapt it advantageously to the pigment to be dispersed and to the application medium as well. By replacing for example short-chain alkyl radicals by those of long-chain in the novolak, the hydrophobic behavior of the oxalkylated novolak is increased, while increasing the ethylene oxide content results in increasing the hydrophilic properties of the compound. When ethylene oxide is replaced by propylene oxide at an identical oxalkylation rate, the hydrophilic properties of the compound are reduced. The hydrophilic and hydrophobic behavior, respectively, of the oxalkylated novolaks may be influenced further by modification of the terminal hydroxy groups of the polyoxyalkylene chains. The hydrophilic behavior may for example be increased by formation of semiesters with polybasic inorganic acids or the derivatives thereof, such as sulfuric acid, chlorosulfonic acid, amidosulfonic acid, phosphoric acid, phosphorus oxychloride or phosphorus pentoxide. Accordingly, the hydrophobic properties can be increased by reaction of the terminal hydroxy groups to form esters, ethers or urethane derivatives.

Often it is advantageous to use for the pigment dispersions simultaneously two or more oxalkylated novolaks which may differ in the novolak component, in the alkylene oxide chains, or in both items. Suitable are water-soluble or water-insoluble compounds, and appropriate oxalkylation rates are in the range of from 2 to 100, preferably 3 to 30 mols of alkylene oxide per reactive OH group of the novolak.

Suitable compounds having at least 2, preferably 2 to 4, especially 2 or 3, long-chain aliphatic radicals containing more than 9, preferably up to 30, especially up to 24, carbon atoms, and being linked with one another via ester and/or acid amide bonds, which are hereinafter called "alkyl compounds", to be used per se or in the form of mixtures, are preferably the following:

(a) reaction products of long-chain acids with long-chain alcohols or amines, (b) reaction products of polyols, polyvalent amines, or of aminoalcohols with long-chain acids, (c) reaction products of polybasic acids with long-chain alcohols or amines, (d) reaction products of aminoacids or hydroxycarboxylic acids with long-chain acids and long-chain amines or alcohols, (e) urea or urethane derivatives which can be obtained by reaction of long-chain isocyanates with long-chain amines or alcohols, and (f) urea or urethane derivatives which can be obtained by reaction of polyvalent isocyanates with long-chain amines or alcohols.

Long-chain acids having more than 9 carbon atoms are for example capric, lauric, myristic, palmitic, stearic, arachidic, behenic, montanic, oleic, erucic, linoleic, linolenic, and ricinolic acid, as well as, acids from the oxo synthesis and acid mixtures obtained from natural raw materials, such as coconut oil, palm kernel oil, linseed oil, soybean oil, sunflower oil, safflower oil, colza oil, cottonseed oil, talloil and castor oil, and from animal fats and oils such as tallow, sperm oil, etc.. Suitable long-chain alcohols or amines having more than 9 carbon atoms are for example the derivatives of the above carboxylic acids. Suitable polyols are glycols such as ethylene-, diethylene-, propylene-, butylene- and hexyleneglycol, glycerol, trimethylolpropane, pentaerythritol and sorbitol; suitable polyvalent amines are ethylene diamine, propylene diamine, hexamethylene diamine, diethylene triamine, triethylene tetramine, piperazine and diamino-cyclohexane, as well as diamines having long-chain alkyl radicals such as laurylpropylene diamine, stearylpropylene diamine and tallow fat propylene diamine; suitable aminoalcohols are ethanolamine, diethanolamine, triethanolamine and alkanolamines having long-chain alkyl or alkenyl radicals such as N,N-di-(hydroxyethyl)-laurylamine, -stearylamine, -oleylamine and -coconut fatty amine.

Examples of suitable polybasic acids are oxalic, malonic, succinic, adipic, suberic, sebacic, maleic, fumaric, citric, phosphoric and phosphonic acids; and examples of amino- or hydroxycarboxylic acids are glycine, alanine, sarcosine, ε-aminocaproic acid, glycolic acid, lactic, malic or tartric acid.

Suitable long-chain isocyanates can be prepared for instance from the above long-chain amines; examples in this context are dodecyl-, hexadecyl- and octadecyl-isocyanate. Suitable diisocyanates are obtained in corresponding manner from the above diamines. Important are for example hexamethylene-diisocyanate and isophoronediisocyanate, and the higher molecular weight polyisocyanates obtainable from diisocyanates.

Suitable water-retention agents are essentially polyols, glycol ethers and acid amides, for example ethyleneglycol, diethyleneglycol, triethyleneglycol, low molecular weight polyethyleneglycols, propyleneglycol, dipropyleneglycol, low molecular weight polypropyleneglycols, butyleneglycols, hexyleneglycols, glycerol, diglycerol, pentaerythritol, sorbitol, ethyl- or butyldiglycol and formamide.

Usual additives are for example preserving agents, foam-reducing substances, antisettling agents, viscosity regulators, grinding auxiliaries and substances promoting pigment wetting.

Depending on the grain hardness of the pigments used, the pigment dispersions are prepared in known manner with the use of saw tooth agitators (dissolvers), rotor-stator mills, ball mills, sand or bead mills, kneader equipment or roller mills.

The pigment dispersions may contain up to 80 weight % of pigment, and there is no technologically required minimum with respect to pigment concentration. Preferred pigment contents range from 5 to 80 weight %.

The content of oxalkylated novolaks in the pigment dispersions may vary within wide limits, for example between 0.1 and 40 weight %; preferred is a range from 1 to 25 weight %.

The content of urea and/or alkyl compounds is suitably in the range of from 0.2 to 40 weight %, preferably 0.5 to 30 weight %, the content of urea being in the range of from 0 to 30, preferably 0 to 25 weight %, and that of alkyl compound in the range of from 0 to 10, preferably 0 to 5, weight %.

The content of water and/or water retention agent as well as of auxiliaries is suitable in a range of from 5 to 90, preferably 10 to 70, weight %.

Oxalkylated condensation products of alkyl group containing aromatic hydroxy compounds and formaldehyde are known. Their most important application is that of splitting crude oil/water emulsions, but in U.S. Pat. No. 2,454,541 it is mentioned that they are suitable as dispersants for pigments. Surprisingly, it has now been observed that their use and the use of those condensation products which were condensed with alkanals introducing side chains instead of formaldehyde to yield the novolak enables preparation of pigment dispersions which are stable to flocculation to such an extent that they remain stable even when being stirred into those media containing substances inciting flocculation, for example methyl- or methyl-hydroxyethyl cellulose.

A further aspect of the invention is therefore furthermore the use of pigment dispersions containing pigments, oxalkylated novolaks of aromatic hydroxy compounds and alkanals, water and/or water retention agents, and optionally usual auxiliaries, for pigmenting aqueous cellulose ether-containing systems. These dispersions are furthermore suitable for blending with dispersions of the invention containing urea and/or alkyl compounds which have a rather universal application range, because thus no auxiliaries are entrained which are alien to the system and possibly incompatible.

The advantage of the improved stability in cellulose ether-containing aqueous systems, however, can be utilized to a limited extent only, because the viscosity of liquid pigment dispersions containing the above condensation products rises considerably sometimes even at room temperature, or during prolonged storage at a slightly elevated temperature of for example 50° C., so that the dispersions become creamy or pasty and cannot be distributed any more in the application medium, or with great difficulty only. In accordance with the invention, this disadvantage of the above dispersions can be overcome by incorporation of urea and/or alkyl compounds.

In many cases it is advantageous that the dispersions contain urea and the alkyl compounds as well, because these additives not only improve the rheological properties of the dispersions, but very often increase also their tinctorial strength and stability to flocculation, and reduce foam formation. Because of their good storage stability and resistance to flocculation, their high yield (tinctorial strength) and the brilliancy of the color shades obtainable with their use, the pigment dispersions of the invention can be employed with advantage on a very universal scale for pigmenting natural and synthetic materials, this pigmentation being carried out preferably in an aqueous medium. They are for example excellently suitable for pigmenting printing inks and paints based on homo- and copolymers of acrylonitrile, acrylic acid, methacrylic acid and the esters thereof, butadiene, styrene, vinyl acetate or vinyl propionate, or saponified alkyd resins or resin or oil emulsions. Furthermore, they are appropriate for the manufacture of print pastes or dyeing baths for paper, textiles or leather, or for pigmenting spinning solutions. Another application field concerns paints which contain natural binders such as starch, dextrin, vegetable or animal glues or cellulose derivatives such as methyl cellulose, methylhydroxyethyl cellulose, hydroxymethyl cellulose, hydroxyethyl cellulose or carboxymethyl cellulose.

In order to demonstrate the good stability to flocculation of the pigment dispersions, dyeings in an emulsion paint based on acrylic resin, called "test dispersion", are described in the examples. The emulsion paint contains 200 parts by weight of stabilized rutile pigment, 240 parts by weight of extender pigments (substantially dolomite), 400 parts by weight of commercial acrylic resin dispersion suitable for emulsion paints, and as heavy flocculation-inducing substance 3.3 parts by weight of a methylhydroxyethyl cellulose having a mean viscosity of 4 Pas at 20° C. in a 2% aqueous solution. The remaining 156.7 parts by weight consist of water and the usual stabilizers.

Pigment dispersions poorly stabilized against flocculation separate in flakes when they are manually stirred into the test dispersion. Because of the relatively low viscosity of the test dispersion, only a vigorous mechanical intermixing produces the high shearing forces necessary for redispersing the particles. In some cases, however, redispersion in the test dispersion is impossible or possible only under conditions which are not feasible in practice. When a pigment dispersion separates in flakes on being stirred into the test dispersion, the tinctorial strength of the pigment contained therein is not fully utilized. After spreading the paint, for example on art paper, its viscosity rises rapidly by evaporation or penetration of the liquid into the substrate. It is therefore possible to redisperse at least partially the flocculated pigment at the corresponding place by overpainting the scarcely dried paint layer by means of a brush or by rubbing with a finger. The area rubbed has a more intense color than the adjacent areas remaining untreated. This "rub-out test" is a simple, but safe test method for evaluating the stability to flocculation of pigment dispersions.

It has already been mentioned that pigment dispersions which are not composed in accordance with the invention but contain only oxalkylated novolaks are prone on storage to an increase of viscosity to a paste consistency. This may occur at room temperature shortly after their preparation, or after some days, after weeks or even after months. Storage at slightly elevated temperature, for example at 50° C., although in principle not ensuring identical results, gives a general line on the practical usefulness of the tested dispersion after a short time. Storage time may be further reduced when stirring the dispersion at 65° C. in a closed vessel, presumably because alterations the speed of which is controlled by diffusion processes on simple storage of the dispersion are accelerated by mechanical agitation. In the cases where heat storage is mentioned in the examples, the dispersion was thoroughly agitated for 2 hours at 65° C. in a water bath by means of a magnetic agitator. In the case of some comparative dispersions, the agitator could not be moved any more after a few minutes.

The following examples illustrate the invention without limiting it thereto. All quantities are indicated in parts by weight.

EXAMPLE 1

400 Parts C.I. Pigment Red 146 (Colour Index No. 12485) are pasted with
80 parts of an adduct of 88 mols ethylene oxide and subsequently 20 mols propylene oxide to 1 mol of a condensation product of 7 mols nonylphenol and 6 mols formaldehyde,
20 parts N-oleyl-oleamide,
50 parts urea,
75 parts ethyleneglycol and
75 parts glycerol
in a divided trough kneader, kneaded for 90 minutes and subsequently diluted with
298 parts water in which
2 parts preserving agent are dissolved.

The pigment dispersion so prepared remains liquid even on heat storage; it can be easily distributed manually in the test dispersion and yields coats of high tinctorial strength giving unobjectionable results in the rub-out test.

EXAMPLE 1a

When in Example 1 the
80 parts block oxalkylate of 88 mols ethylene oxide and 20 mols propylene oxide are replaced by
80 parts mixed oxalkylate of 80 mols ethylene oxide and 25 mols propylene oxide added to 1 mol of the same condensation product of 7 mols nonyl phenol and 6 mols formaldehyde, a pigment dispersion is obtained having the same good heat storage stability and which, stirred into the test dispersion, gives also coats of high tinctorial strength with good rub-out test results.

EXAMPLE 1b

When in Example 1 the
20 parts N-oleyl-oleamide and the
50 parts urea are replaced by
35 parts ethyleneglycol and
35 parts glycerol, a pigment dispersion is obtained which, when stirred into the test dispersion, gives coats of high tinctorial strength with perfect rub-out test results, but becomes pasty after a 10 minutes' heat storage.

EXAMPLE 1c

When in Example 1 the
20 parts N-oleyl-oleamide are replaced by
10 parts ethyleneglycol and
10 parts glycerol, a pigment dispersion is obtained which, when stirred into the test dispersion, gives coats of high tinctorial strength with good rub-out test results, but becomes pasty after a 25 minutes' heat storage.

EXAMPLE 1d

When in Example 1 the
50 parts urea are replaced by
25 parts ethyleneglycol and
25 parts glycerol, a pigment dispersion is obtained which, when stirred into the test dispersion, gives coats of high tinctorial strength with good rub-out test results, but becomes pasty after a 15 minutes' heat storage.

EXAMPLE 2

250 Parts C.I. Pigment Violet 23 (Colour Index No. 51319) are pasted with
80 parts of an adduct of 105 mols ethylene oxide added to 1 mol of a condensation product of 7 mols nonylphenol and 6 mols formaldehyde,
60 parts of an adduct of 42 mols propylene oxide added to 1 mol of a condensation product of 7 mols nonylphenol and 6 mols formaldehyde,
20 parts trioleyl phosphate,
50 parts urea,
19 parts ethyleneglycol and
18 parts glycerol in a divided trough kneader, kneaded for 2 hours and then diluted with
102 parts ethyleneglycol,
102 parts glycerol and
298 parts water in which
2 parts preservative were dissolved. The fluid pigment dispersion remains liquid even on heat storage, can be easily stirred into the test dispersion and gives coats of high tinctorial strength with perfect rub-out test results.

EXAMPLE 2a

When in Example 2 the
20 parts tri-oleyl phosphate and the
parts urea are replaced by
35 parts ethyleneglycol and
35 parts glycerol, a liquid pigment dispersion is obtained which becomes creamy on heat storage, but becomes at least pourable again on agitation after having cooled. On being stirred into the test dispersion, the pigment dispersion flocculates and gives dull coats of poor tinctorial strength and poor rub-out test results.

EXAMPLE 2b

When in Example 2 the
50 parts urea are replaced by
25 parts ethyleneglycol and
25 parts glycerol, a pigment dispersion is obtained which on heat storage has a similar behavior as that of Example 2a, but in the test dispersion has nearly the same good results as the pigment dispersion of Example 2.

EXAMPLE 2c

When in Example 2 the
20 parts tri-oleyl phosphate are replaced by
10 parts ethyleneglycol and
10 parts glycerol, the pigment dispersion so obtained has a similar behavior on heat storage as the pigment dispersions of Examples 2a and 2b. When stirred into the test dispersion, however, it gives coats having the same good tinctorial strength and the same good rub-out test results as the pigment dispersion of Example 2.

EXAMPLE 3

680 Parts chrome oxide green are stirred in portions into a mixture of
30 parts of an addition product of 30 mols ethylene oxide to a novolak of 2 mols o-cresol and 1 mol i-tridecanal,
30 parts of an addition product of 31 mols ethylene oxide to a novolak of 2 mols i-octylphenol and 1 mol i-tridecanal,
20 parts of an addition product of 30 mols ethylene oxide to a novolak of 3 mols nonylphenol and 2 mols formaldehyde,
5 parts linseed oil,
30 parts urea,
30 parts glycerol,
30 parts hexyleneglycol,
30 parts butyldiglycol,
109 parts water,
1 part preservative and
5 parts linseed oil fatty acid, and the batch is agitated in a dissolver until a grain size of less than 2 $\mu$m is obtained. The well flowable pigment dispersion so obtained can be easily incorporated into the test dispersion; the coats do not show any flocculation signs and have a high tinctorial strength.

EXAMPLE 4

According to Example 3, a pigment dispersion is prepared which contains the following components:
700 parts chrome oxide green,
20 parts of a block copolymer, for preparation of which 18 mols ethylene oxide, 18 mols propylene oxide and again 18 mols ethylene oxide, one after the other, were added to a condensation product of 9 mols nonylphenol and 8 mols formaldehyde,
50 parts of an addition product of 10 mols ethylene oxide to 1 mol nonylphenol,
5 parts N-oleyl-oleamide,
70 parts diethyleneglycol,
80 parts propyleneglycol,
69 parts water,
1 part preservative and
5 parts oleic acid.

The dispersion has very good rheological properties which are not adversely affected by heat storage. The coats of the test dispersion so pigmented are distinguished by their high tinctorial strength and excellent rub-out test results.

EXAMPLE 4a (Comparison)

When in Example 4 the
20 parts of the block copolymer are replaced by
20 parts of an addition product of 10 mols ethylene oxide to 1 mol nonylphenol, a pigment dispersion is obtained which is not pourable and has a creamy consistency.

EXAMPLE 5

550 Parts of C.I. Pigment Yellow 83 having high hiding power (Colour Index No. 21108) are kneaded in a divided trough kneader for 1 hour together with
40 parts of an addition product of 90 mols ethylene oxide to a novolak of 3 mols nonylphenol and 2 mols formaldehyde,
20 parts of an addition product of 16 mols ethylene oxide to a mixed novolak of 1.5 mols p-cresol, 1.5 mols nonylphenol and 2 mols formaldehyde,
5 parts of an addition product of 2 mols oleylamine to 1 mol hexamethylene-diisocyanate,
35 parts urea,
60 parts formamide,
60 parts diethyleneglycol and
90 parts water. After dilution of the kneaded mass with further
140 parts water, a well flowable pigment dispersion is obtained which after heat storage is only significantly thickened. The pigment dispersion can be distributed in the test medium in an especially easy manner. The dyeings are distinguished by a high hiding power and in the rub-out test do not show any flocculation signs whatsoever.

EXAMPLE 6

By means of a dissolver (saw tooth agitator),
400 parts C.I. Pigment Blue 15:1 (Colour Index Nr. 74160) are stirred into a mixture of
120 parts of an addition product of 90 mols ethylene oxide to 1 mol of a condensation product of 3 mols nonylphenol and 2 mols formaldehyde,
50 parts urea,
20 parts tri-oleyl phosphate,
160 parts ethyleneglycol and
200 parts water, the batch is ground for 2 hours in a bead mill and subsequently diluted with
48 parts water containing
2 parts preservative in dissolved form. On heat storage, the pigment dispersion remains in perfect state, it can be easily stirred into the test dispersion and gives intensely colored coats having a perfect rub-out test result.

EXAMPLE 6a (Comparison)

In Example 6, the
120 parts of the addition product (90 mols ethylene oxide to 1 mol of condensation product of 3 mols nonylphenol and 2 mols formaldehyde) are replaced by
120 parts of an addition product of 30 mols ethylene oxide to 1 mol nonylphenol, and a pigment dispersion is obtained which flocculates on being stirred into the test dispersion and therefore yields dull coats of poor color intensity and poor rubout test results.

EXAMPLE 7

700 Parts iron oxide red are introduced in portions into a mixture of
60 parts of an adduct of 105 mols ethylene oxide to a condensation product of 7 mols nonylphenol and 6 mols formaldehyde,
20 parts of an ester of o-phosphoric acid and 2 mols wax alcohol,
20 parts urea,
100 part ethyleneglycol,
1 part preservative and
79 parts water, and the batch is dispersed by means of a dissolver until a grain size of less than 2 μm is obtained. After dilution with a further
20 parts water, a well flowable dispersion is obtained which on heat storage shows no signs of thickening. The dispersion so obtained is easily stirred into the test dispersion and gives coats of high color intensity and a perfect rub-out test result.

EXAMPLE 7a

When in Example 7 the
20 parts urea are replaced by
20 parts of an ester of o-phosphoric acid and 2 mols wax alcohol, a pigment dispersion is obtained which can be poured with difficulty only.

EXAMPLE 7b

When in Example 7 the
20 parts of the ester of o-phosphoric acid and 2 mols wax alcohol are replaced by
20 parts urea, a pourable pigment dispersion is obtained. The rub-out test shows signs of flocculation.

EXAMPLE 7c

When in Example 7 the
20 parts of the ester of o-phosphoric acid and 2 mols wax alcohol, and furthermore the
20 parts urea are replaced by
20 parts ethyleneglycol and
20 parts water, a pourable pigment dispersion is obtained which cannot be stirred into the test medium as easily as that of Example 7. The rub-out test shows clear signs of flocculation.

EXAMPLE 7d (Comparison)

When in Example 7 the
60 parts of the addition product of 105 mols ethylene oxide to a condensation product of 7 mols nonylphenol and 6 mols formaldehyde are replaced by
60 parts of an addition product of 15 mols ethylene oxide to 1 mol nonylphenol, a dispersion is obtained which has considerably poorer rheological properties than that of Example 7.

EXAMPLE 7e (Comparison)

When in Example 7c the
60 parts of the addition product of 105 mols ethylene oxide to a condensation product of 7 mols nonylphenol and 6 mols formaldehyde are replaced by
60 parts of an addition product of 15 mols ethylene oxide to 1 mol nonylphenol, a non-flowable paste is obtained which can be distributed in the test medium only with great difficulty. Furthermore, the rub-out tests show signs of heavy flocculation.

EXAMPLE 8

500 Parts C.I. Pigment Orange 5 (Colour Index No. 12075) are pasted in a divided trough kneader with
35 parts of an addition product of 46.5 mols ethylene oxide to a mixed novolak of 1.5 mols p-cresol, 1.5 mols nonylphenol and 2 mols formaldehyde,
60 parts of an addition product of 45 mols ethylene oxide to a novolak of 3 mols nonylphenol and 2 mols formaldehyde,
5 parts of an addition product of 2 mols octadecyl-isocyanate to 1 mol tallow fat propylene diamine,
70 parts urea and 95 parts ethyleneglycol, and the batch is kneaded for 1 hour. Subsequently, the kneaded mass is diluted with
35 parts ethyleneglycol,
198 parts water and
2 parts preservative to give a very well flowable pigment dispersion, which is resistant to heat storage without any signs of thickening. Moreover, the pigment dispersion is distinguished by easy distribution in the test dispersion, by pure and brilliant dyeings having a high color intensity and by perfect rub-out test results.

EXAMPLE 9

500 Parts C.I. Pigment Green 7 (Colour Index No. 74260) are stirred into
100 parts of an addition product of
105 parts ethylene oxide to 1 mol of the novolak of 7 mols nonylphenol and 6 mols formaldehyde
10 parts glycerol distearate,
180 parts ethyleneglycol and
120 parts of water by means of a dissolver (saw tooth agitator), ground for 2 hours in a bead mill and subsequently diluted with
88 parts water in which
2 parts preservative are dissolved. The pigment dispersion remains perfect on heat storage, can be easily stirred into the test dispersion and yields coats having a high color intensity and excellent rub-out test results.

EXAMPLE 9a (Comparison)

When in Example 9 the
100 parts of the addition product of 105 mols ethylene oxide to 1 mol of the novolak of 7 mols nonylphenol and 6 mols formaldehyde are replaced by
100 parts of an adduct of 15 mols ethylene oxide to 1 mol nonylphenol, a pigment dispersion is obtained which, on being stirred into the test dispersion, flocculates and thus gives coats having a poor color intensity and poor rub-out test results.

EXAMPLE 10

30 Parts of an addition product of 224 mols ethylene oxide to 1 mol of a novolak of 9 mols nonylphenol and 8 mols formaldehyde,
30 parts of a block copolymer obtained by addition of 42 mols propylene oxide and subsequently 104 mols ethylene oxide to 1 mol of a novolak of 7 mols nonylphenol and 6 mols formaldehyde,
40 parts sodium dodecylbenzenesulfonate,
10 parts tri-oleyl phosphate,
15 parts urea and
20 parts water are introduced into a divided trough kneader, and
150 parts 2,9-dimethyl-quinacridone pigment are added in portions. After 1 hour of kneading, the batch is diluted with
105 parts urea and
2 parts preservative, dissolved in
198 parts water, to yield a very well flowable, slightly thixotropic pigment dispersion which is well flowable even after heat storage. The dispersion is easily distributed in the test dispersion and gives pure and brilliant coats having a high color intensity, which in the rub-out test do not show any signs of flocculation.

EXAMPLE 11

According to Example 7, a pigment dispersion is prepared which is composed as follows:
770 parts chrome oxide green,
10 parts of a block copolymer obtained by addition of 12 mols ethylene oxide and 6 mols propylene oxide to 1 mol of a condensation product of 3 mols nonylphenol and 2 mols formaldehyde.
40 parts of an addition product of 30 mols ethylene oxide to 1 mol of a condensation product of 3 mols nonylphenol and 2 mols formaldehyde,
5 parts of a condensation product of 1 mol ethylenediamine and 2 mols oleic acid,
20 parts urea,
20 parts ethyleneglycol,
20 parts diethyleneglycol,
20 parts triethyleneglycol,
89 parts water,
1 part preservative and
5 parts oleic acid.

When this well flowable pigment dispersion is stirred into the test dispersion and spread onto art paper, intense dyeings are obtained which show no signs of flocculation in the rub-out test. The good rheological properties are not adversely affected by heat storage.

EXAMPLE 12

A pigment dispersion having the same good properties as that of Example 11 is obtained by combining the following components:
770 parts chrome oxide green,
10 parts of a block copolymer obtained by addition of 18 mols ethylene oxide, 18 mols propylene oxide and again 18 mols ethylene oxide to 1 mol of a condensation product of 9 mols nonylphenol and 8 mols formaldehyde,
40 parts of an addition product of 224 mols ethylene oxide to 1 mol of a condensation product of 9 mols nonylphenol and 8 mols formaldehyde,
5 parts N-oleyl-oleamide,
30 parts urea,
30 parts propyleneglycol,
30 parts dipropyleneglycol,
79 parts water,
1 part preservative and
5 parts oleic acid.

EXAMPLE 13

120 Parts of an addition product of 105 mols ethylene oxide to 1 mol of a novolak of 7 mols nonylphenol and 6 mols formaldehyde,
10 parts of an addition product of octadecyl-isocyanate to oleylamine,
100 parts urea and
130 parts ethyleneglycol are introduced into a divided trough kneader and
200 parts of a pigment carbon black having a specific surface according to BET of 320 $m^2/g$ are added in portions. After 1 hour of kneading, the batch is diluted with
110 parts ethyleneglycol,
328 parts water and
2 parts preservative.

The pigment dispersion so obtained has good rheological properties, which deteriorate only insignificantly on heat storage. It can be easily stirred into the test dispersion and yields dyeings having an intense color which do not show any signs of flocculation.

EXAMPLE 13a

When in Example 13 the 10 parts of the addition product of octadecylisocyanate to oleylamine are replaced by 10 parts water, a well flowable carbon black dispersion is obtained which shows only slight traces of thickening on heat storage. After having been stirred into the test dispersion, coats having an intense color and good rub-out test results are obtained which can be compared with those of Example 13.

EXAMPLE 13b

When in Example 13 the 100 parts urea are replaced by 100 parts ethyleneglycol, a slightly thixotropic, flowable carbon black dispersion is obtained which markedly shows signs of thickening on heat storage. The coats of the test dispersion so pigmented have a slightly lower color intensity than those of Example 13, and the rub-out tests show slight traces of flocculation.

EXAMPLE 13c

When in Example 13 the 100 parts urea are replaced by 100 parts ethyleneglycol and 10 parts of the addition product of octadecyl-isocyanate to oleylamine by 10 parts water, a pourable pigment dispersion is obtained which shows heavy thixotropy and clear signs of flocculation in the rub-out test. On heat storage, moreover, marked signs of thickening become manifest.

EXAMPLE 13d (Comparison)

When in Example 13 the 120 parts of the addition product of 105 mols ethylene oxide to 1 mol of a novolak of 7 mols nonylphenol and 6 mols formaldehyde are replaced by 120 parts of an addition product of 15 mols ethylene oxide to 1 mol nonylphenol, a pigment dispersion having a creamy consistency is obtained which, after vigorous agitation, is at the limit of being pourable. The carbon black dispersion can be distributed in the test dispersion only with difficulty and gives coats of poor color intensity which in the rub-out test show signs of considerable flocculation.

EXAMPLE 13e (Comparison)

When in Example 13c the 120 parts of the addition product of 105 mols ethylene oxide to 1 mol of a novolak of 7 mols nonylphenol and 6 mols formaldehyde are replaced by 120 parts of an addition product of 15 mols ethylene oxide to 1 mol nonylphenol, a carbon black paste is obtained which is non-flowable and can be distributed in the test dispersion only with great difficulty. The coats of poor color intensity show signs of very heavy flocculation in the rub-out test.

EXAMPLE 13f

When in Example 13 the 120 parts of the addition product of 105 mols ethylene oxide to 1 mol of novolak of 7 mols nonylphenol and 6 mols formaldehyde are replaced by 120 parts of an addition product of 91 mols ethylene oxide to 1 mol of a novolak of 7 mols nonylphenol and 6 mols formaldehyde, 70 parts ethyleneglycol are replaced by 70 parts urea and 10 parts water by 10 parts of the addition product of octadecylisocyanate to oleylamine, a pigment dispersion having the same color properties and still better rheological behavior than that of Example 13 is obtained. No thickening whatsoever can be observed on heat storage of this carbon black dispersion.

EXAMPLE 14

400 Parts C.I. Pigment Yellow 83 (Colour Index No. 21108) are pasted in a divided trough kneader together with
80 parts of an addition product of 105 mols ethylene oxide to 1 mol of a condensation product of 7 mols nonylphenol and 6 mols formaldehyde
50 parts urea,
20 parts of an amide obtained by condensation of 1 mol oleyl-sarcosine with 1 mol oleylamine,
100 parts ethyleneglycol and
100 parts glycerol, and the batch is kneaded for 90 minutes and subsequently diluted with
248 parts water containing
2 parts of a preservative in dissolved form. The pigment dispersion so obtained remains fluid on heat storage. In can be distributed easily and manually in the test dispersion and yields brilliant coats of high color intensity and perfect rub-out test results.

EXAMPLE 14a

When in Example 14 the 50 parts urea and the 20 parts of the amide of oleyl-sarcosine and oleylamine are replaced by 35 parts ethyleneglycol and 35 parts glycerol, a pigment dispersion is obtained which becomes creamy on heat storage.

EXAMPLE 14b

When in Example 14 the 20 parts of the cited amide are replaced by 10 parts glycol and 10 parts glycerol, a pigment dispersion is obtained which remains liquid on heat storage and yields coats having nearly the same color intensity as the pigment dispersion of Example 14 and good results in the rub-out test.

EXAMPLE 14c

When in Example 14 the 50 prts urea are replaced by 25 parts ethyleneglycol and 25 parts glycerol, a pigment dispersion is obtained which remains liquid on heat storage and gives coats having nearly the same color intensity with good results in the rub-out test as the dispersion of Example 14.

EXAMPLE 14d (Comparison)

When in Example 14 the 80 parts of the addition product of 105 mols ethylene oxide to 1 mol of a condensation product of 7 mols nonylphenol and 6 mols formaldehyde are replaced by 80 parts of an addition product of 15 mols ethylene oxide to 1 mol nonylphenol, a pigment dispersion is obtained which becomes pasty on heat storage and, after having been stirred into the test dispersion, gives dull coats of poor color intensity. The rub-out test shows that the pigment dispersion flocculates in the test dispersion.

EXAMPLE 14e

When in Example 14 30 of the 80 parts of the addition product of 105 mols ethylene oxide to 1 mol of the novolak of 7 mols nonylphenol and 6 mols formaldehyde are replaced by 30 parts of the sodium salt of the trisulfuric acid semiester of an addition product of 18 mols ethylene oxide to 1 mol of the novolak of 3 mols nonylphenol and 2 mols formaldehyde, a pigment dispersion is obtained which remains fluid on heat storage and after having been stirred into the test dispersion gives coats of high color intensity with perfect rub-out test results.

What is claimed is:

1. A dispersion containing
   (a) a pigment,
   (b) an oxalkylated novolak
   (c) urea and/or a compound containing at least two aliphatic chains of more than 9 carbon atoms and connected by a bridge member, which compound is an ester or amide derived from a long-chain acid and a long-chain alcohol or a long-chain amine, an ester or amide of a polyhydric alcohol, a polyamine or an amino-alcohol and a long-chain acid, an ester or amide of a polybasic inorganic or organic acid and a long-chain alcohol or long-chain amine, an ester or amide of a long-chain acid with a hydroxy-alkane carboxylic acid or amino-acid and a long-chain alcohol or a long-chain amine, a urea or urethane from a long-chain isocyanate and long-chain amine or a long-chain alcohol, or a urea or urethane from a polyvalent-isocyanate and a long-chain amine or a long-chain alcohol; and
   (d) water and agents for retarding the drying up of the dispersion.

2. A dispersion as claimed in claim 1, wherein the novolak moiety of the oxalkylated novolak is a reaction product of an aromatic hydroxy compound of the formula

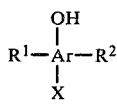

and an alkanal of the formula

wherein Ar is benzene or naphthalene; $R^1$, $R^2$ and $R^3$, independently of each other, are hydrogen, alkyl, alkenyl, aralkyl or cycloalkyl of up to 30 carbon atoms each, which groups may be interupted by —O—, —S—, —NR$^4$—, —CO—, —COO—, —CONR$^4$— or arylene and which groups are unsubstituted or substituted by halogen, hydroxy or carboxy; X is hydrogen, halogen, —OR$^4$, —COR$^4$, —COOR$^4$ or —CONR$^4$R$^5$,
$R^4$ and $R^5$ being, independently of each other, hydrogen or alkyl of 1 to 6 carbon atoms.

3. A dispersion as claimed in claim 2, wherein the novolak contains per each 2 aromatic rings at least one alkyl group of more than 5 carbon atoms.

4. A dispersion as claimed in claim 2, wherein the novolak has a molecular weight of 400 to 5000.

5. A dispersion as claimed in claim 2, wherein the novolak is a condensation product of an alkylphenol and formaldehyde in a molar ratio of 12:11 to 2:1.

6. A dispersion as claimed in claim 1, wherein the oxalkylated novolak contains ethylene oxide units, propylene oxide units or both.

7. A dispersion as claimed in claim 1, wherein the oxalkylated novolak contains "blocks" of different oxalkyl units.

8. A dispersion as claimed in claim 1, wherein the oxalkylated novolak contains 2 to 100 alkylene oxide units per reactive aromatic hydroxy group.

9. A dispersion as claimed in claim 1, wherein the terminal hydroxy groups of the oxalkylated novolak are totally or partially modified by forming a semiester, ester, ether or urethane.

10. A dispersion as claimed in claim 1 containing more than one oxalkylated novolak which differ in one or both of the novolak components, in the oxalkyl chains or in more than one of these features.

11. A dispersion as claimed in claim 1, wherein the compound containing at least 2 aliphatic chains is an ester or amide deriving from a long-chain acid and a long-chain alcohol or long-chain amine.

12. A dispersion as claimed in claim 1, wherein the compound containing at least 2 aliphatic chains is an ester or amide of a polyhydric alcohol, a polyamine or an amino-alcohol and a long-chain acid.

13. A dispersion as claimed in claim 1, wherein the compound containing at least 2 aliphatic chains is an ester or amide of a polybasic inorganic or organic acid and a long-chain alcohol or long-chain amine.

14. A dispersion as claimed in claim 1, wherein the compound containing at least 2 aliphatic chains is an ester or amide of a long-chain acid with a hydroxy-alkane carboxylic acid or amino-acid and a long-chain alcohol or a long-chain amine.

15. A dispersion as claimed in claim 1, wherein the compound containing at least 2 aliphatic chains is a urea or urethane from a long-chain isocyanate and a long-chain amine or a long-chain alcohol.

16. A dispersion as claimed in claim 1, wherein the compound containing at least 2 alkyl chains is a urea or urethane from a polyvalent isocyanate and a long-chain amine or a long-chain alcohol.

17. A dispersion as claimed in claim 1, wherein the agent retarding the drying up is an amide, a polyhydric alcohol, an ether thereof or a mixture of such compounds.

18. A process for pigmenting articles which comprises incorporating into these articles or coating these articles with a layer containing a dispersion as claimed in claim 1.

19. A process for pigmenting an aqueous system containing a cellulose ether which comprises adding to this system a dispersion as claimed in claim 1.

20. A process for pigmenting an aqueous system which comprises adding to this system a dispersion containing a pigment, an oxalkylated novolak as claimed in claim 1, water, and an agent retarding the drying up of the dispersion.

21. A process for pigmenting an aqueous system which comprises adding to this system a dispersion containing a pigment, an oxalkylated novolak as claimed in claim 23, and an agent for retarding the drying up of the dispersion.

22. A dispersion as defined in claim 1, wherein the oxalkylated novolak is selected from the group consisting of oxalkylated condensation products of aromatic hydroxy compounds and alkanals, each said aromatic hydroxy compound being of the formula

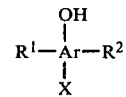

and each said alkanal being of the formula $$R^3-\overset{\overset{O}{\|}}{C}-H$$

in which Ar is a benzene or naphthalene radical; $R^1$, $R^2$ and $R^3$, independently of one another, are hydrogen or alkyl, alkenyl or aralkyl of up to 30 carbon atoms, or said alkyl, alkenyl or aralkyl interrupted by —O—, —S—, —$NR^4$—, —CO—, —COO—, —$CONR^4$— or arylene, or said alkyl, alkenyl, aralkyl, interrupted alkyl, interrupted alkenyl, or interrupted aralkyl substituted by halogen, hydroxy or carboxy; and X is hydrogen, halogen, —$OR^4$, —$COR^4$, —$COOR^4$ or —$CONR^4R^5$, $R^4$ and $R^5$, independently of one another, being hydrogen or alkyl of up to 6 carbon atoms.

23. A dispersion containing
(a) a pigment,
(b) an oxalkylated novolak,
(c) urea and/or a compound containing at least two aliphatic chains of more than 9 carbon atoms and connected by a bridge member, which compound is an ester or amide derived from a long-chain acid and a long-chain alcohol or a long-chain amine, an ester or amide of a polyhydric alcohol, a polyamine or an amino-alcohol and a long-chain acid, an ester or amide of a polybasic inorganic or organic acid and a long-chain alcohol or long-chain amine, an ester or amide of a long-chain acid with a hydroxyalkane carboxylic acid or amino-acid and a long-chain alcohol or a long-chain amine, a urea or urethane from a long-chain isocyanate and long-chain amine or a long-chain alcohol, or a urea or urethane from a polyvalent-isocyanate and a long-chain amine or a long-chain alcohol; and
(d) agents for retarding the drying up of the dispersion.

24. A dispersion as defined in claim 23, wherein the oxalkylated novolak is selected from the group consisting of oxalkylated condensation products of aromatic hydroxy compounds and alkanals, each said aromatic hydroxy compound being of the formula $$\underset{X}{\overset{OH}{R^1-Ar-R^2}}$$

and each said alkanal being of the formula $$R^3-\overset{\overset{O}{\|}}{C}-H$$

in which Ar is a benzene or naphthalene radical; $R^1$, $R^2$ and $R^3$, independently of one another, are hydrogen or alkyl, alkenyl or aralkyl of up to 30 carbon atoms, or said alkyl, alkenyl or aralkyl interrupted by —O—, —S—, —$NR^4$—, —CO—, —COO—, —$CONR^4$— or arylene, or said alkyl, alkenyl, aralkyl, interrupted alkyl, interrupted alkenyl, or interrupted aralkyl substituted by halogen, hydroxy or carboxy; and X is hydrogen, halogen, —$OR^4$, —$COR^4$, —$COOR^4$ or —$CONR^4R^5$, $R^4$ and $R^5$, independently of one another, being hydrogen or alkyl of up to 6 carbon atoms.

25. A process for pigmenting articles, which comprises incorporating into these articles or coating these articles with a layer containing a dispersion as claimed in claim 23.

26. A process for pigmenting an aqueous system containing a cellulose ether, which comprises adding to this system a dispersion as claimed in claim 23.

27. A dispersion as claimed in claim 1, containing, referred to the weight,
(a) 5 to 80% of pigment,
(b) 0.1 to 40% of oxalkylated novolak,
($c_1$) 0 to 30% of urea,
($c_2$) 0 to 10% of the compound containing at least two aliphatic chains of more than 9 carbon atoms and connected by a bridge member, which compound is an ester or amide derived from a long-chain acid and a long-chain alcohol or a long-chain amine, an ester or amide of a polyhydric alcohol, a polyamine or an amino-alcohol and a long-chain acid, an ester or amide of a polybasic inorganic or organic acid and a long-chain alcohol or long-chain amine, an ester or amide of a long-chain acid with a hydroxyalkane carboxylic acid or amino-acid and a long-chain alcohol or a long-chain amine, a urea or urethane from a long-chain isocyanate and long-chain amine or a long-chain alcohol, or a urea or urethane from a polyvalent-isocyanate and a long-chain amine or a long-chain alcohol, the sum of ($c_1$) and ($c_2$) being 0.2 to 40%, and
(d) 5 to 90% of water and an agent retarding the drying up of the dispersion.

28. A dispersion as claimed in claim 23, containing, referred to the weight,
(a) 5 to 80% pigment,
(b) 0.1 to 40% of oxalkylated novolak,
($c_1$) 0 to 30% urea,
($c_2$) 0 to 10% of the compound containing at least two aliphatic chains of more than 9 carbon atoms and connected by a bridge member, which compound is an ester or amide derived from a long-chain acid and a long-chain alcohol or a long-chain amine, an ester or amide of a polyhydric alcohol, a polyamine or an amino-alcohol and a long-chain acid, an ester or amide of a polybasic inorganic or organic acid and a long-chain alcohol or long-chain amine, an ester or amide of a long-chain acid with a hydroxyalkane carboxylic acid or amino-acid and a long-chain alcohol or a long-chain amine, a urea or urethane from a long-chain isocyanate and long-chain amine or a long-chain alcohol, or a urea or urethane from a polyvalent-isocyanate and a long-chain amine or a long-chain alcohol, the sum of ($c_1$) and ($c_2$) being 0.2 to 40%, and
(d) 5 to 90% of agents for retarding the drying up of the dispersion.

29. A dispersion as claimed in claim 1, consisting essentially of, referred to the weight,
(a) 5 to 80% of pigment,
(b) 1 to 25% of oxalkylated novolak,
($c_1$) 0 to 25% of urea,
($c_2$) 0 to 5% of the compound containing at least two aliphatic chains of more than 9 carbon atoms and connected by a bridge member, which compound is an ester or amide derived from a long-chain acid and a long-chain alcohol or a long-chain amine, an ester or amide of a polyhydric alcohol, a polyamine or an amino-alcohol and a long-chain acid, an ester or amide of a polybasic inorganic or organic acid and a long-chain alcohol or long-chain amine, an ester or amide of a long-chain acid with a hydroxy-alkane carboxylic acid or amino-acid and a long-chain alcohol or a long-chain amine, a urea or urethane from a long-chain isocyanate and long-chain amine or a long-chain alcohol, or a urea or urethane from a polyvalent-isocyanate and a long-chain amine or a long-chain alcohol; the sum of ($c_1$) and ($c_2$) being 0.5 to 30%, and (d) 10 to 70% of water and an agent retarding the drying up of the dispersion.

30. A dispersion as claimed in claim 23, consisting essentially of, referred to the weight,
(a) 5 to 80% of pigment,
(b) 1 to 25% of oxalkylated novolak,
($c_1$) 0 to 25% of urea,
($c_2$) 0 to 5% of the compound containing at least two aliphatic chains of more than 9 carbon atoms and connected by a bridge member, which compound is an ester or amide derived from a long-chain acid and a long-chain alcohol or a long-chain amine, an ester or amide of a polyhydric alcohol, a polyamine or an amino-alcohol and a long-chain acid, an ester or amide of a polybasic inorganic or organic acid and a long-chain alcohol or long-chain amine, an ester or amide of a long-chain acid with a hydroxy-alkane carboxylic acid or amino-acid and a long-chain alcohol or a long-chain amine, a urea or urethane from a long-chain isocyanate and long-chain amine or a long-chain alcohol, or a urea or urethane from a polyvalent-isocyanate and a long-chain amine or a long-chain alcohol, the sum of ($c_1$) and ($c_2$) being 0.5 to 30%, and (d) 10 to 70% of an agent for retarding the drying up of the dispersion.

* * * * *